United States Patent [19]

Shibata et al.

[11] Patent Number: 5,056,813
[45] Date of Patent: Oct. 15, 1991

[54] VEHICLE SUSPENSION SYSTEM

[75] Inventors: Mineharu Shibata, Otake; Shin Takehara; Toshiki Morita, both of Higashi-Hiroshima, all of Japan

[73] Assignee: Mazda Motor Corporation, Hiroshima, Japan

[21] Appl. No.: 522,791

[22] Filed: May 14, 1990

[30] Foreign Application Priority Data

May 17, 1989 [JP] Japan .................... 64-124066

[51] Int. Cl.$^5$ ............................................. B60G 11/26
[52] U.S. Cl. ...................................... 280/707; 280/840
[58] Field of Search ............... 280/840, 6.1, 702, 703, 280/709, 707; 188/299

[56] References Cited

U.S. PATENT DOCUMENTS

| | | | |
|---|---|---|---|
| 4,371,182 | 2/1983 | Brown | 280/6.12 |
| 4,452,906 | 8/1989 | Buma et al. | 280/840 |
| 4,828,283 | 5/1989 | Ishii et al. | 280/707 |
| 4,869,528 | 9/1989 | Buma et al. | 280/840 |

FOREIGN PATENT DOCUMENTS

| | | |
|---|---|---|
| 0114757 | 8/1984 | European Pat. Off. . |
| 0263947 | 9/1987 | European Pat. Off. . |
| 0264944 | 4/1988 | European Pat. Off. . |
| 0306004 | 3/1989 | European Pat. Off. . |
| 0358231 | 3/1990 | European Pat. Off. . |
| 1-95927 | 4/1989 | Japan . |

*Primary Examiner*—Kenneth R. Rice
*Attorney, Agent, or Firm*—Fleit, Jacobson, Cohn, Price, Holman & Stern

[57] ABSTRACT

A vehicle suspension system includes a cylinder device provided between a vehicle body member and a vehicle wheel member for the vehicle body member in which suspension characteristics are changed by controlling a hydraulic fluid supply for the cylinder device. A pressure detector detects a hydraulic pressure of the cylinder device for each of the vehicle wheel members, and a warp control unit computes a warping of vehicle body so as to control a hydraulic fluid supply for the cylinder device in a manner such that the warp of the vehicle body is suppressed. The warp control unit is provided with a front pressure ratio computing section for computing a front hydraulic pressure ratio between the cylinder devices for right and left front wheels, and a rear pressure ratio computing section for computing a rear hydraulic pressure ratio between the cylinder devices for right and left rear wheels so that the warp control unit controls the hydraulic fluid supply for the cylinder device based on the front and rear hydraulic pressure ratios. The front pressure ratio computing section produces a value of the hydraulic pressure ratio corresponding to a threshold limit value when the front hydraulic pressure ratio computed in the front pressure ratio computing section is beyond the threshold limit value. An understeer property of the vehicle can thus be obtained in a high lateral acceleration condition.

2 Claims, 7 Drawing Sheets

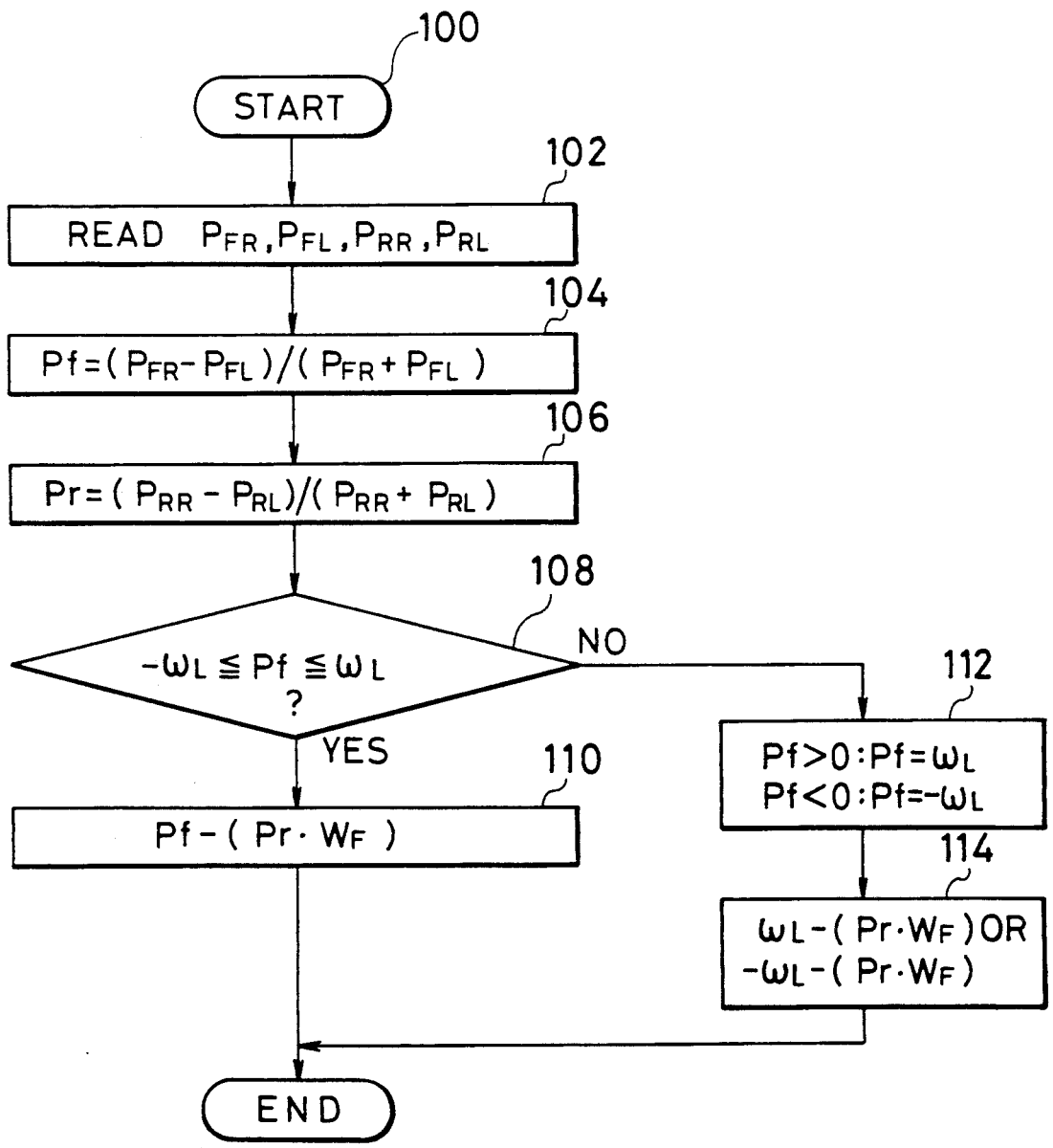

VEHICLE SUSPENSION SYSTEM

BACKGROUND OF THE INVENTION

1. Field of the Invention

This invention relates to a suspension system for a vehicle, and, in particular, to an active suspension system.

2. Description of the Related Art

A conventional active suspension is disclosed in, for example, Japanese Patent Publication 62-96113, laid open to the public on May 2, 1987, a European Patent Application laid open to the public on Aug. 1, 1984 under publications number 0114757, and U.S. Pat. No. 4,371,182, issued on Feb. 1, 1983. In the active suspension as disclosed in the publication enumerated above, a cylinder device is provided for each vehicle wheel member between a vehicle body member and a vehicle wheel member. By controlling a supply of the hydraulic fluid for the cylinder device, the hydraulic fluid in the cylinder device can be changed so that the vehicle suspension characteristics are changed.

In the active suspension system, a hydraulic pressure is detected and a warping of the vehicle body is computed based on the hydraulic pressure detected. A warp control is accomplished by controlling a hydraulic fluid supply for the cylinder device.

The warp control is made based on a hydraulic pressure ratio in the cylinder devices between a right and left front wheels and a hydraulic pressure ratio between a right and left rear wheels. Therefore, if the hydraulic pressure ratio for the front wheels takes the same value as that for the rear wheels, the warp control is not carried out. However, it is desirable to make the warp control, in the case where a lateral acceleration is increased, even when the hydraulic pressure ratios are the same and there is no warping of the vehicle body to so as to obtain an understeer property of the vehicle.

SUMMARY OF THE INVENTION

An object of the invention is, therefore to provide a vehicle suspension system in which the understeer property of the vehicle can be obtained in an increased lateral acceleration condition.

Another object of the present invention is to provide a vehicle suspension system in which the war control is made when the lateral acceleration is high.

The above object of the invention can be accomplished by a vehicle suspension system comprising a cylinder device provided between a vehicle body member and a vehicle wheel member for the vehicle body member in which suspension characteristics are changed by controlling hydraulic fluid supply for the cylinder device. Pressure detecting means detects a hydraulic pressure of the cylinder device for each of the vehicle wheel member, and warp control means computes a warping of the vehicle body so as to control a hydraulic fluid supply for the cylinder device in a manner such that the warp of the vehicle body is suppressed. The warp control means is provided with front pressure ratio computing means for computing a front hydraulic pressure ratio between the cylinder devices for right and left front wheels and rear pressure ratio computing means for computing a rear hydraulic pressure ratio between the cylinder devices for the right and left rear wheels so that the warp control means controls the hydraulic fluid supply for the cylinder device based on the front and rear hydraulic pressure ratios. The front pressure ratio computing means produces a value of the hydraulic pressure ratio corresponding to a threshold limit value when the front hydraulic pressure ratio computed in the front pressure ratio computing means is provided beyond the threshold limit value.

According to the present invention, the front pressure ratio computing means produces a computed value of the front hydraulic pressure ratio when the computed value is less than the threshold limit value. If the computed value of the front hydraulic pressure ratio is greater than the threshold limit value, or in other words, if the lateral acceleration of the vehicle is relatively high, the front pressure ratio computing means produces a value of the front hydraulic pressure ratio corresponding to the threshold limit value instead of an actual computed value of the front hydraulic pressure ratio.

On the other hand, the rear hydraulic pressure ratio is produced as it is computed, since no threshold limit value is provided for the rear hydraulic pressure ratio. Therefore, the warp control means judges as if the warping of the vehicle body is produced when the front hydraulic pressure ratio computed, is greater than the threshold limit value and controls the hydraulic pressure supply for the cylinder devices to suppress the hypothetical warping of the vehicle body.

Thus, when the lateral acceleration of the vehicle is high, the warp control is carried out so that the understeer property of the vehicle can be accomplished.

BRIEF DESCRIPTION OF THE DRAWINGS

FIG. 4 is a flow chart of a control of a vehicle suspension system according to an embodiment of the invention.

DESCRIPTION OF THE PREFERRED EMBODIMENT

Figure 1:
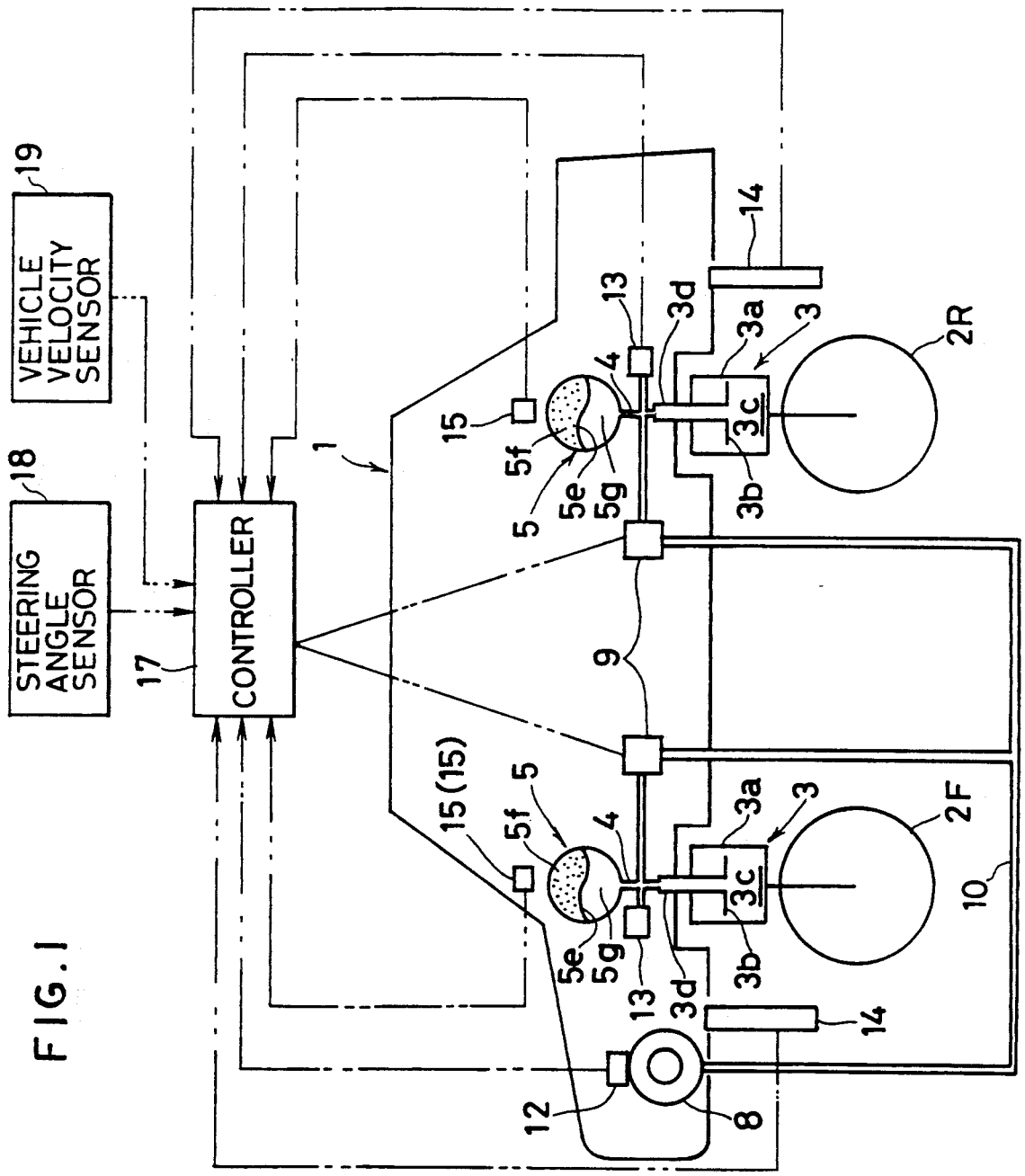
FIG. 1 is an overall schematic view of a vehicle incorporating the suspension system of this invention.

FIG. 1 is an overall schematic view of a vehicle according to the invention. In FIG. 1, numeral 1 designates a vehicle body member or a vehicle body, and 2F and 2R, respectively designate front and rear vehicle wheel members. Between vehicle body 1 and front wheels 2F, and between vehicle body 1 and rear wheels 2R are provided hydraulic cylinders 3, 3. A piston 3b inserted into each cylinder body 3a defines a fluid pressure chamber 3c inside each hydraulic cylinder 3. The upper end portion of a rod 3d connected to the piston 3b is connected to the vehicle body 1, and cylinder bodies 3a, 3a are connected to vehicle wheels 2F, 2R respectively.

A gas spring 5 is connected to the fluid pressure chamber 3c of each hydraulic cylinder 3 through a communicating path 4. Each gas spring 5 is divided into a gas chamber 5f and a fluid pressure chamber 5g by a diaphragm 5e, and the fluid pressure room 5g is connected to the fluid pressure chamber 3c of the hydraulic cylinder 3 through the communicating path 4 and the piston 3b of the hydraulic cylinder 3.

Numeral 8 designates a hydraulic pump, and numerals 9, 9 designate proportional flow control valves connected to the hydraulic pump 8 through a fluid pressure path 10. These valves function to control fluid supply for the hydraulic cylinders 3, 3.

Numeral 12 designates a discharge pressure gauge which senses the discharge pressure of the hydraulic pump 8, and numerals 13, 13 designate fluid pressure sensors which sense the fluid pressure of the fluid pressure chamber 3c in the hydraulic cylinders 3, 3. Numerals 14, 14 designate vehicle height sensors which sense the vehicle height displacement (cylinder stroke length), and numerals 15, 15, 15 designate vertical acceleration sensors which sense the vertical acceleration of the vehicle (spring acceleration of the wheels 2F, 2R). These vertical acceleration sensors 15, 15, 15 are provided one above each of the right and left front wheels 2F within an approximately horizontal plane, and one at the center of the vehicle in the widthwise direction between the rear wheels 2R. Namely, a total of three vertical acceleration sensors are provided.

Numerals 18, 19 designate a steering angle sensor and a vehicle speed sensor, respectively.

The signals from the above mentioned sensors are input to a controller 17 constituted of CPU (central processing unit) and the like, which controls the proportional flow control valves 9, 9 so as to change the suspension characteristics.

Figure 2:
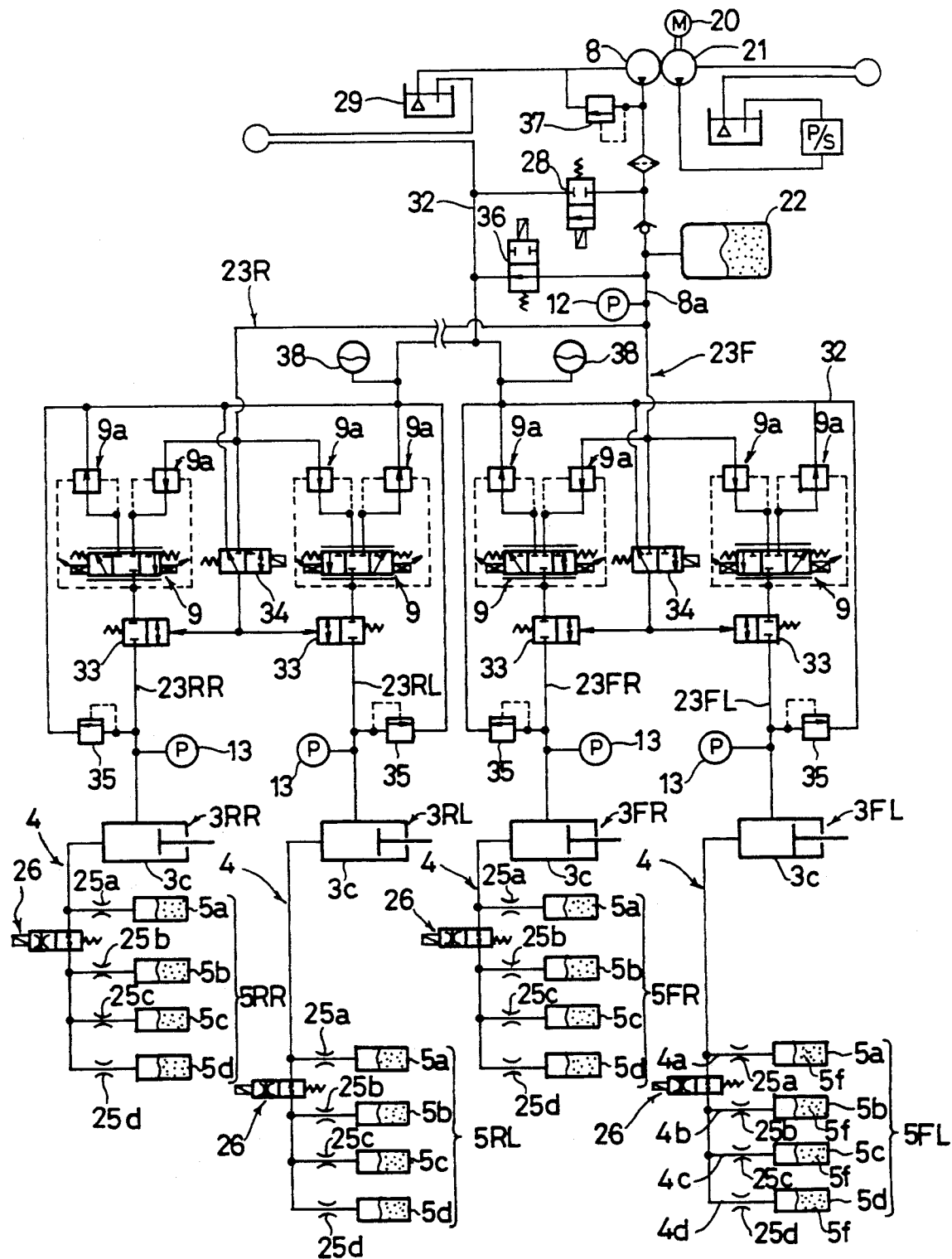
FIG. 2 is a circuit diagram of a hydraulic system for controlling fluid supply for hydraulic cylinder devices.
Figure 3A:
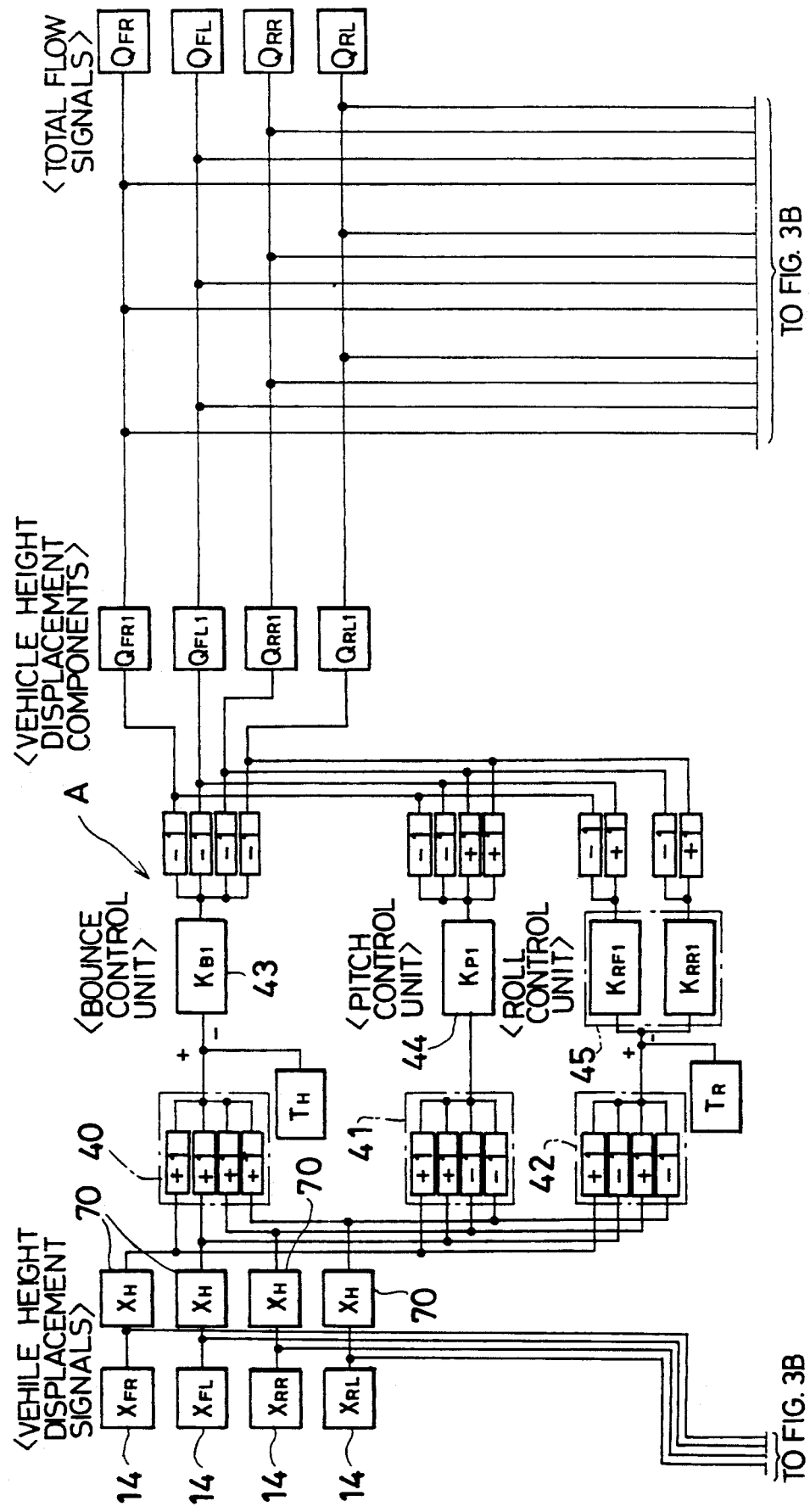
FIGS. 3A through 3D are block diagrams illustrating control of suspension characteristics by a controller.
Figure 3B:
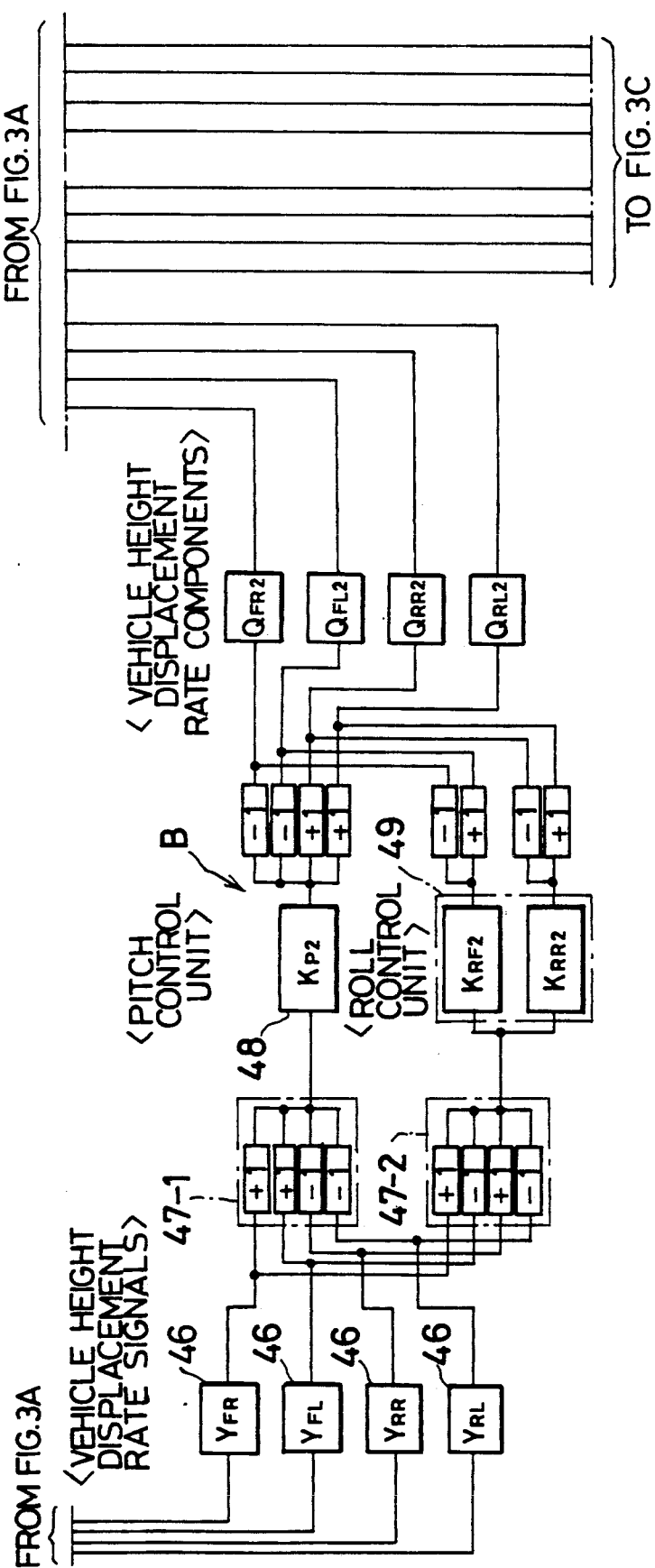
Figure 3C:
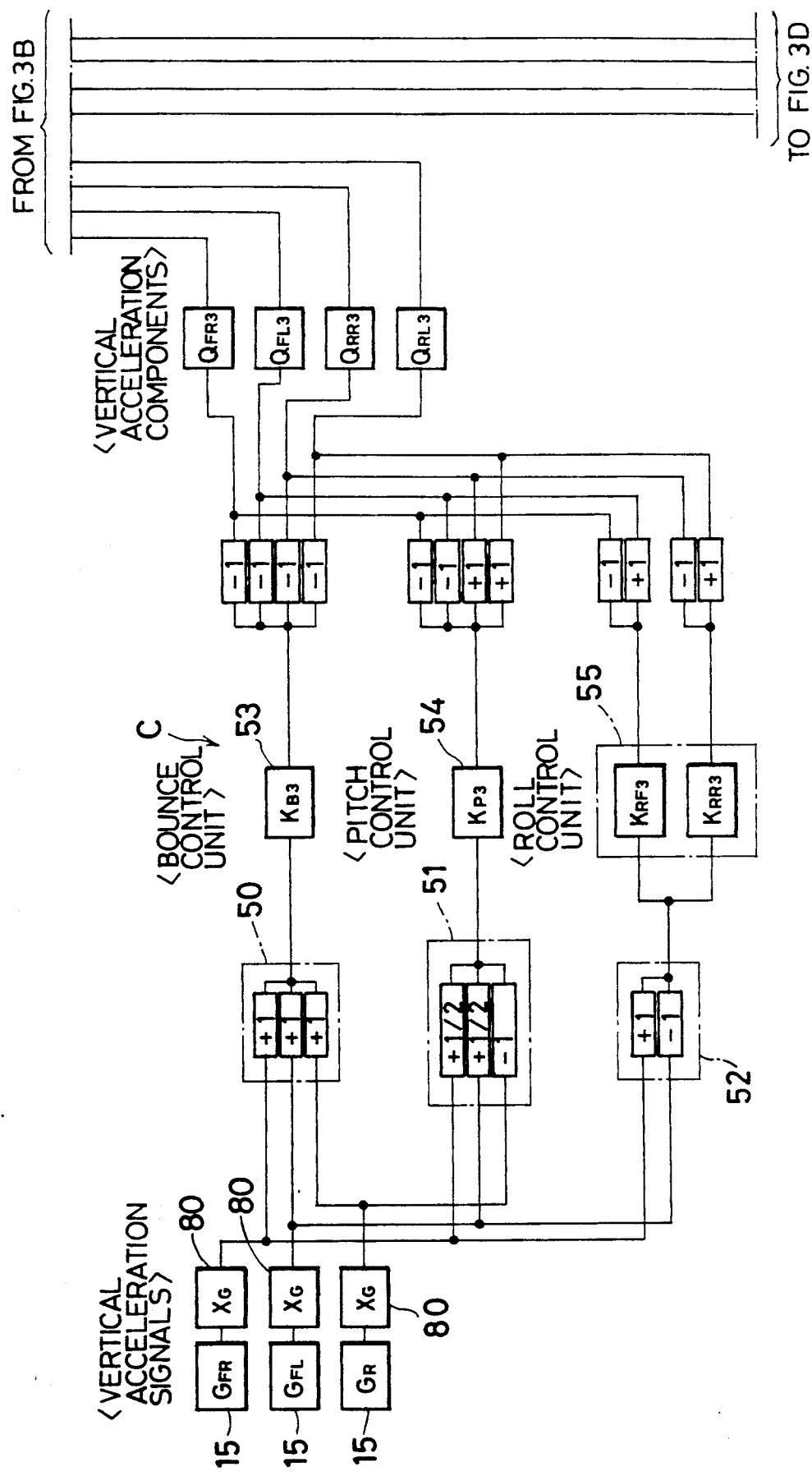
Figure 3D:
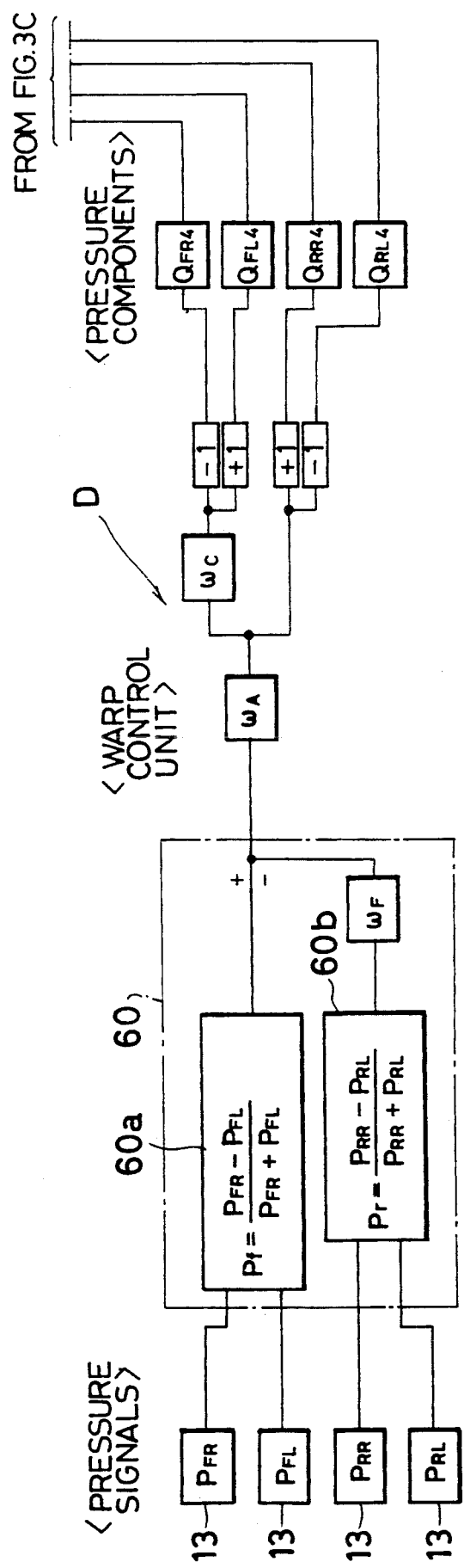

FIG. 2 shows a hydraulic circuit for supplying and discharging hydraulic fluid for the hydraulic cylinders 3.

As seen in FIG. 2, the hydraulic pump 8 is connected in tandem with a hydraulic pump 21 driven by a driving motor 20 for a power steering device. A discharge tube 8a has an accumulator 22 connected with an intermediate portion thereof and a downstream portion of the discharge tube 8a branches off into a front wheel tube 23F and a rear wheel tube 23R. The front wheel tube 23F branches off into a left front wheel tube 23FL and a right front wheel tube 23FR, the downstream ends of which are connected with the fluid pressure chambers 3c, 3c of the hydraulic cylinders 3FL, 3FR.

Likewise, the rear wheel tube 23R branches off into a left wheel tube 23RL and a right wheel tube 23RR, the downstream ends of which are connected with the fluid pressure chambers 3c, 3c of the hydraulic cylinders 3RL, 3RR.

The gas spring devices 5FL through 5RR, connected with the hydraulic cylinders 3FL through 3RR, each has a plurality (four) of gas springs 5a, 5b, 5c, 5d which are connected through branch communicating paths 4a through 4d to a common communicating path 4 connected with the fluid pressure chamber 3c of the corresponding hydraulic cylinder 3. The branch communicating paths 4a through 4d of the plurality (first through fourth) gas springs 5a through 5d of each wheel have orifices 25a through 25d. The damping action by the orifices 25a through 25d and the buffer action of gas charged in the gas chambers 5f are combined to provide the basic function as a suspension system.

In the gas springs 5FL through 5RR of each vehicle wheel, a damping force switching valve 26 which switches the damping force by adjusting the path area of the communicating path 4 is provided on the common communicating path 4 between the first gas spring 5a and the second gas spring gas spring 5b. The switching valve 26 has two positions: an open position (shown in FIG. 2) opening the common communicating path 4 and a throttle position throttling the area of the common communicating path 4.

The discharge tube 8a of the hydraulic pump 8 has an unloader relief valve 28 with an open position and a closed position (shown in FIG. 2) connected near the accumulator 22. When the discharged fluid pressure measured by the discharge pressure gage 12 is more than or equal to a preset upper limit value, the relief valve 28 is switched from the closed position shown in FIG. 2 to the open position, so the fluid in the hydraulic pump 8 is returned directly to a reserve tank 29, whereby the fluid accumulation pressure in the accumulator 22 is controlled to be maintained at a preset value. In the above mentioned manner, the accumulated fluid of preset pressure from the accumulator 22 is supplied to the hydraulic cylinders 3.

As the left front wheel, the right front wheel, the left rear wheel and the right rear wheel are identical in configuration, only the left front wheel will be described in the following.

As explained above, the left front wheel tube 23FL is provided with the proportional flow control valve 9 which has three positions: a stopping position closing all ports (shown in FIG. 2), a supplying position where the left front wheel tube 23FL is opened to the supplying side, and a discharge portion where the hydraulic cylinder 3 of the left front wheel tube 23FL is connected through a return tube 32. The proportional flow control valve 9 is further provided with pressure-compensated valves 9a, 9a. The pressure-compensated valves 9a, 9a maintain the fluid pressure in the fluid pressure chamber 3c at a preset valve when the proportional flow control valve 9 is positioned at either the supplying position or the discharge position.

On the hydraulic cylinder 3 side portion of the proportional flow control valve 9 is provided a pilot pressure active type switching valve 33, which opens and closes the left front tube 23FL. When a solenoid controlled valve 34 which introduces the pressurized fluid in the left front wheel tube 23F is at the open position, the fluid pressure of the solenoid controlled valve 34 is introduced as a pilot pressure to the switching valve 34. When the pilot pressure is more than or equal to a predetermined value, the switching valve 33 operates to open the left front wheel tube 23FL, so that the proportional flow control valve 9 can control the flow to the hydraulic cylinder 3.

The numeral 35 designates a relief valve which opens and operates to return the hydraulic fluid in the fluid pressure chamber 3c of the hydraulic cylinder 3 to the return tube 32 when the fluid pressure of the fluid pressure chamber 3c rises abnormally. The numeral 36 designates an ignition switch interlock valve connected near the accumulator 22 on the discharge tube 8a of the hydraulic pump 8. When the ignition switch is at off position, the interlock valve 36 is controlled to open (shown in FIG. 2) so as to return the fluid in the accumulator 22 to the tank 29 and relieve the high pressure condition of the fluid. The numeral 37 designates a relief valve which returns fluid to the tank 29 and lowers the fluid pressure when the discharge pressure of the hydraulic pump 8 rises abnormally. The numerals 38, 38 designates return accumulators connected to the return tube 32 for accumulating the fluid discharged from the hydraulic cylinder 3.

FIG. 3 is a block diagram illustrating control of suspension characteristics by a controller 17.

FIG. 3 shows a control system A for controlling the vehicle height to a desired value based on vehicle height displacement signals $X_{FR}$, $X_{FL}$, $X_{RR}$, $X_{RL}$ from the vehicle height sensors 14, 14, 14, 14 of the vehicle wheels, a control system B for suppressing vehicle height displacement rates based on the vehicle height displacement rate signals $Y_{FR}$, $Y_{FL}$, $Y_{RR}$, $Y_{RL}$ obtained from the vehicle height displacement signals, a control system C for lowering vertical vibration of the vehicle based on vertical acceleration signals $G_{FR}$, $G_{FL}$, $G_R$ of the three vertical acceleration sensors 15, 15, 15, and a control system D for suppressing vehicle body warping computed from pressure signals $P_{FR}$, $P_{FL}$, $P_{RR}$, $P_{RL}$ of the fluid pressure sensors 13, 13, 13, 13 of the vehicle wheels.

First, in the control system A, numeral 40 designates a bounce component arithmetic unit which computes the vehicle bounce components by summing not only the outputs $X_{FR}$, $X_{FL}$ of the right and left front wheels 2F but also the outputs $X_{RR}$, $X_{RL}$ of the right and left rear wheels 2R from the vehicle height sensors 14, 14, 14, 14. Numeral 41 designates a pitch component arithmetic unit which computes the vehicle pitch components by subtracting the summed outputs $X_{RR}$, $X_{RL}$ of the right and left rear wheels 2R from summed outputs $X_{FR}$, $X_{FL}$ of the right and left front wheels 2F. Numeral 42 designates a roll component arithmetic unit which computes vehicle roll components by summing the difference $X_{FR}-X_{FL}$ of the outputs of the right and left front wheels 2F and the difference $X_{RR}-X_{RL}$ of the outputs of the right and left rear wheels 2R. Numeral 43 designates a bounce control unit which is input the vehicle bounce component computed in the bounce component arithmetic unit 40 and a desired average vehicle height $T_H$, and which computes controlled variables of the proportional flow control valves 9, 9, 9, 9 based on a gain coefficient $K_{B1}$ under bounce control. Numeral 44 designates a pitch component unit to which is input vehicle pitch components computed in the pitch component arithmetic unit 41 and which computes controlled variables of the proportional flow control valves 9, 9, 9, 9 based on a gain coefficient $K_{PI}$ under pitch control. Numeral 45 designates a roll control unit to which is input vehicle roll components computed in the roll component arithmetic unit 42 and a desired roll displacement $T_R$, and which computes controlled variables of the proportional flow control valves 9, 9, 9, 9 based on gain coefficients $K_{RF1}$, $K_{RR1}$ under roll control so as to level vehicle height corresponding to the desired roll displacement $T_R$.

For the purpose of controlling vehicle height to the desired value, the controlled variables computed in the above mentioned control units 43, 44, 45 are reversed with respect to the signs of the vehicle height displacement signals of vehicle height sensors 14, 14, 14, 14. After that, each controlled bounce, pitch and roll variables for the vehicle wheels are added and flow signals $Q_{FR1}$, $Q_{FL1}$, $Q_{RR1}$, $Q_{RL1}$ of corresponding proportional flow control valves 9, 9, 9, 9 are Obtained in the control system A.

Between the vehicle height sensors 14, 14, 14, 14 and the arithmetic units 40, 41, 42 are provided dead zone devices 70, 70, 70, 70, which output their vehicle height displacement signals $X_{FR}$, $X_{FL}$, $X_{RR}$, $X_{RL}$ only when the vehicle height displacement signals $X_{FR}$, $X_{FL}$, $X_{RR}$, $X_{RL}$ from the vehicle height sensors 14, 14, 14, 14 exceed the preset dead zone $X_H$.

Next in the control system B, vehicle height displacement signals $X_{FR}$, $X_{FL}$, $X_{RR}$, $X_{RL}$ from the vehicle height sensors 14, 14, 14, 14, are input to differentiators 46, 46, 46, 46, by which differential components of the vehicle height displacement signals $X_{FR}$, $X_{FL}$, $X_{RR}$, $X_{RL}$, or vehicle height displacement rate signals $Y_{FR}$, $Y_{FL}$, $Y_{RR}$, $Y_{RL}$ are obtained.

Here, the vehicle height displacement rate is obtained by the following equation.

$$Y=(X_n-X_{n-1})/T$$

$X_n$: vehicle height at time t
$X_{n-1}$: vehicle height at time t−1
T: sampling time Numeral 47-1 designates a pitch component arithmetic unit which computes the vehicle pitch elements by subtracting the summation of the outputs $Y_{RR}$, $Y_{RL}$ of the right and left rear wheels 2R from summation of the outputs $Y_{FR}$, $Y_{FL}$ of the right and left front wheels 2F. Numeral 47-2 designates a roll element arithmetic unit which computes vehicle roll components by summing difference $Y_{FR}-Y_{FL}$ of the outputs of the right and left front wheels 2F and the difference $Y_{RR}-Y_{RL}$ of the outputs of the right and left rear wheels 2R.

Further, numeral 48 designates a pitch control unit to which is input the vehicle pitch component computed in the pitch component arithmetic unit 47-1, and which computes controlled variables for the proportional flow control valves 9, 9, 9, 9 based on a gain coefficient $K_{P2}$ for changing the vehicle height displacement change rate gain under pitch control. Numeral 49 designates a roll control unit which is input vehicle roll components computed in the roll component arithmetic unit 47-2, and which computes controlled variables for the proportional flow control valves 9, 9, 9, 9 based on gain coefficients $K_{RF2}$, $K_{RR2}$ for changing the vehicle height displacement change rate gain under roll control.

Thus, each controlled variable computed in the above mentioned control units 48, 49 is reversed with respect to the signs of vehicle height displacement rate signals of the differentiators 46, 46, 46, 46. After that, the controlled pitch and roll variables of the vehicle wheels are added, and flow signals $Q_{FR2}$, $Q_{FL2}$, $Q_{RR2}$, $Q_{RL2}$ for the corresponding proportional flow control valves 9, 9, 9, 9 are obtained in the control system B.

Next in the control system C, numeral 50 designates a bounce component arithmetic unit which computes the vehicle bounce components by summing the outputs $G_{FR}$, $G_{FL}$, $G_R$ of the three vertical acceleration sensors 15, 15, 15. Numeral 51 designates a pitch component arithmetic unit which computes vehicle pitch components by subtracting the output $G_R$ of the rear wheel 2R from the summation of each half-value of outputs $G_{FR}$, $G_{FL}$ of the right and left front wheels 2F in the three vertical acceleration sensors 15, 15, 15. Numeral 52 designates a roll component arithmetic unit which computes vehicle roll components by subtracting the output $G_{FL}$ of the left front wheel from output $G_{FR}$ of the right front wheel.

Further, numeral 53 designates a bounce control unit to which is input vehicle bounce components computed in the bounce component arithmetic unit 50, and which computes controlled variables for the proportional flow control valves 9, 9, 9, 9 of the wheels based on a gain coefficient $K_{B3}$ under bounce control. Numeral 54 designates a pitch control unit to which is input vehicle pitch components computed in the pitch component arithmetic unit 51, and which computes controlled variables for the proportional flow control valves 9, 9, 9, 9 based on a gain coefficient $K_{P3}$ under pitch control. Numeral 55 designates a roll control unit to which is input vehicle roll components computed in the roll component arithmetic unit 52, and which computes controlled variables for the proportional flow control valves 9, 9, 9, 9 based on gain coefficients $K_{RF3}$, $K_{RR3}$ under roll control.

For the purpose of suppressing vehicle vertical vibration by the bounce components, pitch components, and roll components controlled variables in above mentioned control units 53, 54, 55 are reversed in sign in every wheel, and after that, each controlled bounce, pitch and roll variable in each vehicle wheel is added and flow signals $Q_{FR3}$, $Q_{FL3}$, $Q_{RR3}$, $Q_{RL3}$ for corresponding proportional flow control valves 9, 9, 9, 9 are obtained in the control system C.

Between the vertical acceleration sensors 15, 15, 15 and the arithmetic units 50, 51, 52 are provided dead zone devices 80, 80, 80, which output their vertical acceleration signals $G_{FR}$, $G_{FL}$, $G_R$ only when the vertical acceleration signals $G_{FR}$, $G_{FL}$, $G_R$ from the vertical acceleration sensors 15, 15, 15 exceed preset dead zone $X_G$.

Next in the control system D, a warp control unit 60 includes a fluid pressure ratio arithmetic unit 60a of the front wheel to which is input fluid pressure signals $P_{FR}$, $P_{FL}$ of the fluid pressure sensors 13, 13 of the two front wheels and computes the ratio $(R_{FR}-P_{FL})/(P_{FR}+P_{FL})$ of the right and left front wheel pressure difference $(P_{FR}-P_{FL})$ to the front wheel total fluid pressure $(P_{FR}+P_{FL})$, and a fluid pressure ratio arithmetic unit 60b of the rear wheel which similarily computes the fluid pressure ratio $(P_{RR}-P_{RL})/(P_{RR}+P_{RL})$ of the rear wheel. Then after the fluid pressure ratio of the rear wheel is multiplied by a gain coefficient $W_F$, the multiplied value is subtracted from the fluid pressure ratio of the front wheel, thus the subtracted value is multiplied by a gain coefficient $W_A$ and moreover is multiplied by a gain coefficient $W_C$ in the front wheel. After that, controlled variables for the wheels are reversed in sign for the purpose of being equalized between right and left wheels, so that flow signals $Q_{FR4}$, $Q_{RL4}$, $Q_{RR4}$, $Q_{RL4}$ of corresponding proportional flow control valves 9, 9, 9, 9 are obtained.

Thus, finally, total flow signals $Q_{FR}$, $Q_{FL}$, $Q_{RR}$, $Q_{RL}$ are obtained by summing vehicle height displacement components $Q_{FR1}$, $Q_{FL1}$, $Q_{RR1}$, $Q_{RL1}$, vehicle height displacement rate components $Q_{FR2}$, $Q_{FL2}$, $Q_{RR2}$, $Q_{RL2}$, vertical acceleration components $Q_{FR3}$, $Q_{FL3}$, $Q_{RR3}$, $Q_{RL3}$ and pressure components $Q_{FR4}$, $Q_{FL4}$, $Q_{RR4}$, $Q_{RL4}$ finally.

Next, in the vehicle suspension system in accordance with the embodiment of the invention, threshold limit values $-\Omega_L$, $\Omega_L$ of the fluid pressure ratio of the front wheel are provided for a value of the fluid pressure computed in the fluid pressure ratio arithmetic unit 60a of the front wheel of the control system D as shown in FIG. 3. If the computed value of the fluid pressure ratio $P_f$ is within a range of $-\Omega_L < P_f < \Omega_L$, the computed value of the fluid pressure ratio for the front wheels is produced as it is computed. However, if the fluid pressure ratio $P_f$ satisfies a condition of $-\Omega_L > P_f$ or $P_f > \Omega_L$ or in other words, if the computed value of the fluid pressure ratio for the front wheels is provided beyond the threshold limit value $-\Omega_L$ or $\Omega_L$, the threshold value $-\Omega_L$ or $\Omega_L$ is produced as the fluid pressure ratio.

Hereinafter, there is described a control for the vehicle suspension system in accordance with the present invention making reference to a flow chart shown in FIG. 4.

In FIG. 4, the procedure starts at step 100. The fluid pressure signals $P_{FR}$, $P_{FL}$ for the right and left front wheels and $P_{RR}$, $P_{RL}$ for the right and left rear wheels are read in step 102.

In step 104, the fluid pressure ratio $P_f$ concerning the front wheels is provided through a formula $(P_{FR}-P_{FL})/(P_{FR}+P_{FL})$ based on the fluid pressure signals $P_{FR}$ and $P_{FL}$ in the fluid pressure arithmetic unit 60a. Likewise, the fluid pressure ratio $P_f$ concerning the front wheels is provided through a formula $(P_{RR}-P_{RL})/(P_{RR}+P_{RL})$ based on the fluid pressure signals $P_{FR}$ and $P_{FL}$ in the fluid pressure arithmetic unit 60b.

In step 108, a judgment is made as to whether or not the fluid pressure ratio $P_f$ for the front wheels is within a range defined by the threshold limit value of the fluid pressure ratios $-\Omega_L$ and $\Omega_L$. If the judgment in step 108 is yes, or if the fluid pressure ratio $P_f$ satisfies the condition of $-\Omega_L < P_f < \Omega_L$, the fluid pressure ratio arithmetic unit 60a produces the fluid pressure ratio $P_f$ as it is computed therein. In this case, the procedure goes to step 110 in which a value $P_f - (P_r \cdot W_F)$ is computed.

On the other hand, if the judgment is no, in other words, if the fluid pressure ratio $P_f$ satisfies a condition of $-\Omega_L > P_f$ or $P_f > \Omega_L$, the procedure goes to step 112 in which the threshold limit value $-\Omega_L$ where it is $P_f < -\Omega_L$ and the value $\Omega_L$ where it is $P_f > \Omega_L$ is produced. In step 114, a value $\Omega_L - (P_r \cdot W_F)$ where it is $P_f > \Omega_L$ is computed.

As mentioned above, the fluid pressure ratio computed in the fluid pressure arithmetic unit 60a for the front wheels takes a value beyond the range defined by the threshold limit values $\Omega_L$ and $-\Omega_L$, the unit 60a produces the threshold limit values $-\Omega_L$ or $\Omega_L$ as a fluid pressure ratio.

On the other hand, no threshold limit value is provided for the fluid pressure ratio arithmetic unit 60b for the rear wheels so that the fluid pressure ratio arithmetic unit 60b produces the fluid pressure ratio $P_r$ for the rear wheels as it is computed therein. Thus, the warp control is carried out when the fluid pressure ratio $P_f$ is provided beyond the threshold limit values as if the warping of the vehicle is to be suppressed. Since the fluid pressure ratio is increased as the lateral acceleration is increased, the warp control is made in the high lateral acceleration condition of the vehicle so as to accomplish the understeer property.

What is claimed is:

1. A vehicle suspension system comprising:
    a plurality of cylinder devices, provided between a vehicle body member and each of a plurality of vehicle wheel members for the vehicle body member, in which suspension characteristics are changed by controlling hydraulic fluid supply for the cylinder devices,
    pressure detecting means for detecting a hydraulic pressure in the cylinder devices for each of the vehicle wheel members, and
    a warp control unit for controlling a hydraulic fluid supply for the cylinder device so that warp of the vehicle body is suppressed, wherein the warp control unit is provided with front pressure ratio computing means for computing a front hydraulic pressure ratio between right and left front wheel cylinder devices and rear pressure ratio computing means for computing a rear hydraulic pressure ratio between right and left rear wheel cylinder devices so that the warp control unit provides flow signals for controlling the hydraulic fluid supply for the cylinder devices based on the front and rear hydraulic pressure ratios, and wherein the front pressure ratio computing means produces a hydraulic pressure ratio value corresponding to a threshold limit value when the front hydraulic pressure ratio computed by the front pressure ratio computing means is beyond the threshold limit value.

2. A vehicle suspension system according to claim 1, wherein respective values of both front and rear hydraulic pressure ratios computed by the front and rear pressure ratio computing means are increased as a lateral acceleration acting on the vehicle is increased.

* * * * *